United States Patent
Morikawa

(10) Patent No.: US 8,867,049 B2
(45) Date of Patent: Oct. 21, 2014

(54) IMAGE FORMING APPARATUS AND IMAGE READING APPARATUS

(75) Inventor: Jun Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 417 days.

(21) Appl. No.: 12/711,181

(22) Filed: Feb. 23, 2010

(65) Prior Publication Data

US 2010/0220345 A1 Sep. 2, 2010

(30) Foreign Application Priority Data

Feb. 27, 2009 (JP) .................................. 2009-047164

(51) Int. Cl.
- H04N 1/387 (2006.01)
- H04N 1/46 (2006.01)
- H04N 1/203 (2006.01)
- H04N 1/32 (2006.01)

(52) U.S. Cl.
CPC ............. *H04N 1/203* (2013.01); *H04N 1/3875* (2013.01); *H04N 1/2032* (2013.01); *H04N 1/32459* (2013.01); *H04N 1/32363* (2013.01)
USPC .......... 358/1.13; 358/452; 358/453; 358/474; 358/540

(58) Field of Classification Search
None
See application file for complete search history.

(56) References Cited

U.S. PATENT DOCUMENTS

| | | | |
|---|---|---|---|
| 4,949,189 A | 8/1990 | Ohmori | |
| 2002/0041407 A1 | 4/2002 | Takahashi et al. | |
| 2002/0063746 A1* | 5/2002 | Suzuki et al. | 347/19 |
| 2004/0190084 A1* | 9/2004 | Shirai | 358/474 |
| 2007/0133045 A1 | 6/2007 | Kubota | |
| 2008/0225348 A1* | 9/2008 | Kubo et al. | 358/474 |
| 2009/0225110 A1* | 9/2009 | Soler et al. | 347/9 |

FOREIGN PATENT DOCUMENTS

| | | |
|---|---|---|
| JP | H02-291764 A | 12/1990 |
| JP | H09-281856 A | 10/1997 |
| JP | 2000-267514 A | 9/2000 |

(Continued)

OTHER PUBLICATIONS

Okada Kazuhiro; "original reading and recording device" JP Pub Date Sep. 2000; Machine translation in english of JP Pub No. 2000267514.*
Kataoka Naota; "image forming apparatus"; JP Pub Date Dec. 2005; Machine translation in english of JP Pub No. 2005352002.*
Machine transition of JP Pub No. 20060158706 to Okada Kazuhiro.*
Machine transition of JP Pub No. 2005352002 to Nataoka Naoto.*
Machine translation in english of JP Pub No. 2005-352002 to Kataoka Naota.*

(Continued)

*Primary Examiner* — Fan Zhang
*Assistant Examiner* — Haris Sabah
(74) *Attorney, Agent, or Firm* — Baker Botts L.L.P.

(57) ABSTRACT

An image forming apparatus includes a first read device configured to read a first surface of an original document in a main scanning direction and to produce a first band data. The image forming apparatus further includes a second read device configured to read a second surface of the original document in the main scanning direction and to produce a second band data during the reading of the first surface by the first read device. The image forming apparatus still further includes an image data processor configured to produce printing band data by combining the first band data with the second band data, during the reading of at least one of the first surface and the second surface. Moreover, the image forming apparatus includes a printing device configured to start printing an image of the printing band data produced by the image data processor on a printing sheet, during the reading of at least one of the first surface and the second surface.

11 Claims, 7 Drawing Sheets

(56) References Cited

FOREIGN PATENT DOCUMENTS

| | | |
|---|---|---|
| JP | 2002-118721 A | 4/2002 |
| JP | 2003-078693 A | 3/2003 |
| JP | 2004-266439 A | 9/2004 |
| JP | 2005-352002 A | 12/2005 |
| JP | 2007-160622 A | 6/2007 |

OTHER PUBLICATIONS

Machine translation in english of JP Pub No. 2000-267514 to Okada Kazuhiro.*

Japan Patent Office, Notice of Reasons for Rejection for Patent Application No. JP 2009-047164 (counterpart to above-captioned patent application), mailed Dec. 14, 2010.

* cited by examiner

IMAGE FORMING APPARATUS AND IMAGE READING APPARATUS

CROSS REFERENCE TO RELATED APPLICATION

The present application claims priority from Japanese Patent Application No. 2009-047164, filed on Feb. 27, 2009, the disclosure of which is incorporated herein by reference in its entirely.

BACKGROUND

1. Technical Field

The present invention relates to an image forming apparatus and an image read apparatus.

2. Related Art

Image forming apparatuses are known in which a first surface and a second surface of an original document are read and the read first surface and the read second surface are printed on a two-in-one basis. Such an image forming apparatus reads the image on the first surface and the image on the second surface of the original document and then produces printing data for two-in-one printing and performs the two-in-one printing based on the produced printing data.

The apparatus, however, has a problem that the start of printing delays because the printing data is produced only after the apparatus has completed the read of all of the first surface and the second surface of the original document.

SUMMARY

A need has arisen to provide an image forming apparatus which may reduces the delay of the start of the printing, and to provide an image reading apparatus suitable for the image forming apparatus which may reduces the delay of the start of the printing.

According to an embodiment of the present invention, an image forming apparatus comprises a first read device configured to read a first surface of an original document, line by line, in a main scanning direction, and to produce a first band data formed of at least one line. The image forming apparatus further comprises a second read device configured to read a second surface of the original document, line by line, in the main scanning direction and to produce a second band data formed of at least one line during the reading of the first surface by the first read device. The image forming apparatus still further comprises an image data processor configured to produce printing band data by combining the first band data with the second band data, during the reading of at least one of the first surface and the second surface performed by the first read device and the second read device, respectively. Moreover, the image forming apparatus comprises a printing device configured to start printing an image of the printing band data produced by the image data processor on a printing sheet, during the reading of at least one of the first surface and the second surface performed by the first read device and the second read device, respectively.

According to an embodiment of the present invention, an image reading apparatus comprises a first read device configured to read a first surface of an original document, line by line, extending in a main scanning direction and to produce first band data formed of at least one line. The image reading apparatus further comprises a second read device configured to read a second surface of the original document, line by line, extending in the main scanning direction and to produce second band data formed of at least one line during the read of the first surface by the first read device. The image reading apparatus still further comprises an image data processor configured to produce a third band data by combining the first band data with the second band data, during the reading of at least one of the first surface and the second surface performed by the first read device and the second read device, respectively. Moreover, the image reading apparatus comprises an output section which outputs the third band data produced by the image data processor, during the reading of at least one of the first surface and the second surface performed by the first read device and the second read device, respectively.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DESCRIPTION OF THE PREFERRED EMBODIMENTS

Embodiments of the invention and their features and advantages may be understood by referring to FIGS. 1-7, like numerals being used for like corresponding parts in the various drawings. In the description given below, an entire configuration of a color printer as an example of an image forming apparatus in brief first, and then characteristic portions of the invention will be described in detail.

Figure 1:
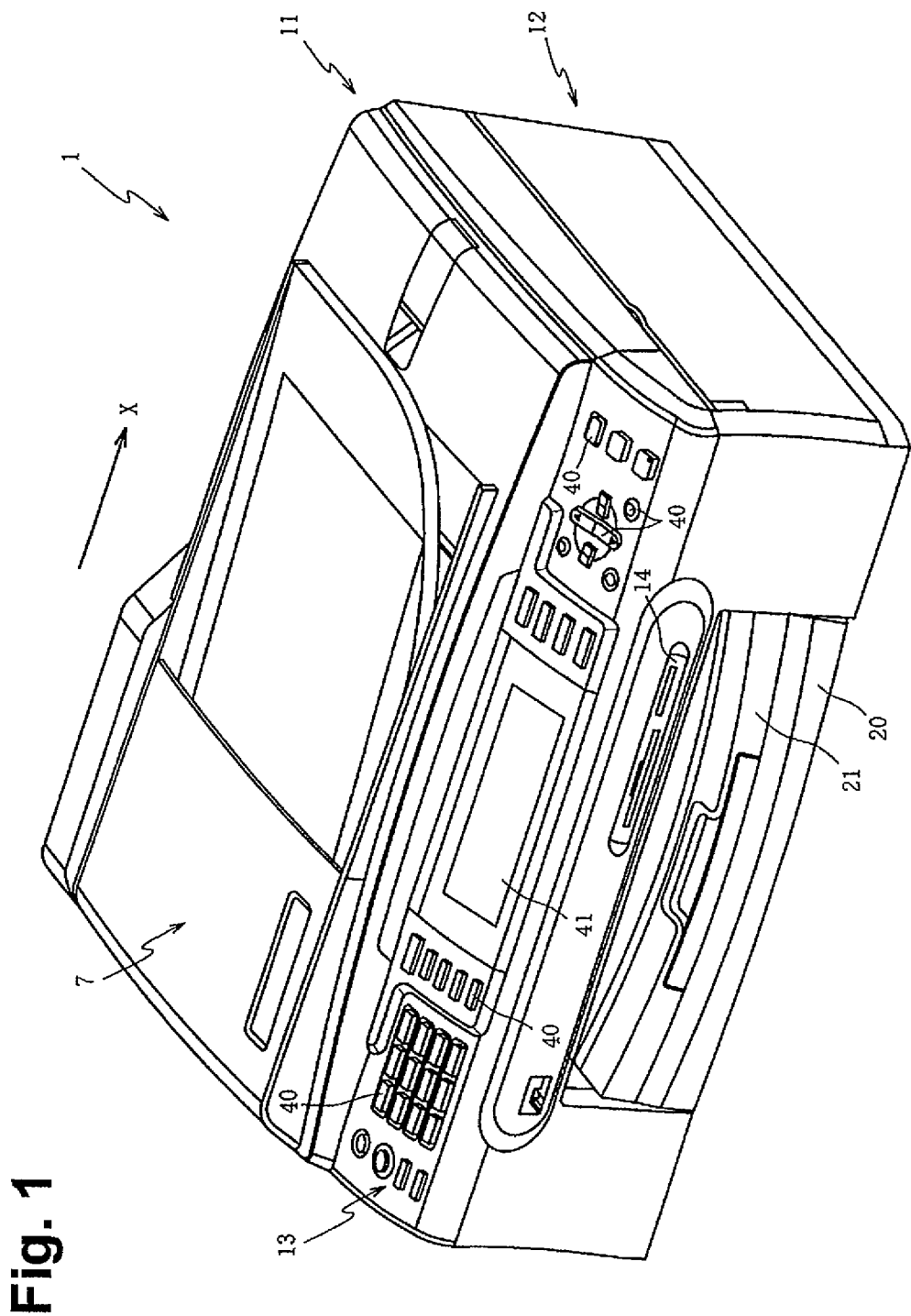
FIG. 1 is a perspective view showing the outer appearance of a multifunction device.

FIG. 1 is a perspective view showing the outer appearance of a multifunction device 1. The multifunction device 1 has various types of functions including call functions, facsimile functions, printer functions, scanner functions, and copy functions.

The multifunction device 1 mainly includes a scanner device 11 in its upper portion, a printing device 12 under the scanner device 11, an operation panel 13 in its upper portion on a front side, and a slot section 14 under the operation panel 13.

The scanner device 11 is configured to read an original document in three modes, that is, a flatbed read mode, a sheet-through Auto Document Feeder (ADF) read mode, and a Contact Image Sensor (CIS) read mode. The flatbed read mode is a mode to read one of the surfaces of an original document put on a platen glass 15 (shown in FIG. 2) placed under an original-document cover 8. The sheet-through ADF read mode is a mode to read one of the surfaces of an original document fed from an ADF 7. The CIS read mode is a mode to read both surfaces of an original document fed from the ADF 7.

The printing device 12 has an opening formed at its front. A feed tray 20 and an ejection tray 21 are provided in the opening. Each of printing sheets stacked in the feed tray 20 is fed to the interior of the printing device 12, a desired image is recorded on the sheet, and then the sheet is ejected to the ejection tray 21.

The feed tray 20 is configured to have a size in which A4-size printing sheets can be placed in both portrait orientation and landscape orientation. An optical sensor 97 (see FIG. 4) capable of detecting the width of the printing sheets stacked in the feed tray 20 is mounted at a position opposite to the feed tray 20, so that the optical sensor 97 detects the width of the printing sheets stacked in the feed tray 20.

The operation panel 13 is provided for operating the scanner device 11 and the printing device 12 and includes various types of operation buttons 40 and an LCD 41 thereon. A user can perform settings and actions of various types of functions by operating the operation panel 13. For example, the user can provide instructions or entries for setting the type of the printing sheet, setting the one-surface/both-surface printing modes, and setting two-in-one printing through the operation panel 13.

The slot section 14 is configured to allow load of various types of small memory cards. For example, while a small memory card is loaded in the slot section 14, the user can operate the operation panel 13 to read image data stored on the small memory card and then print the read image data on the printing sheet.

Figure 2:
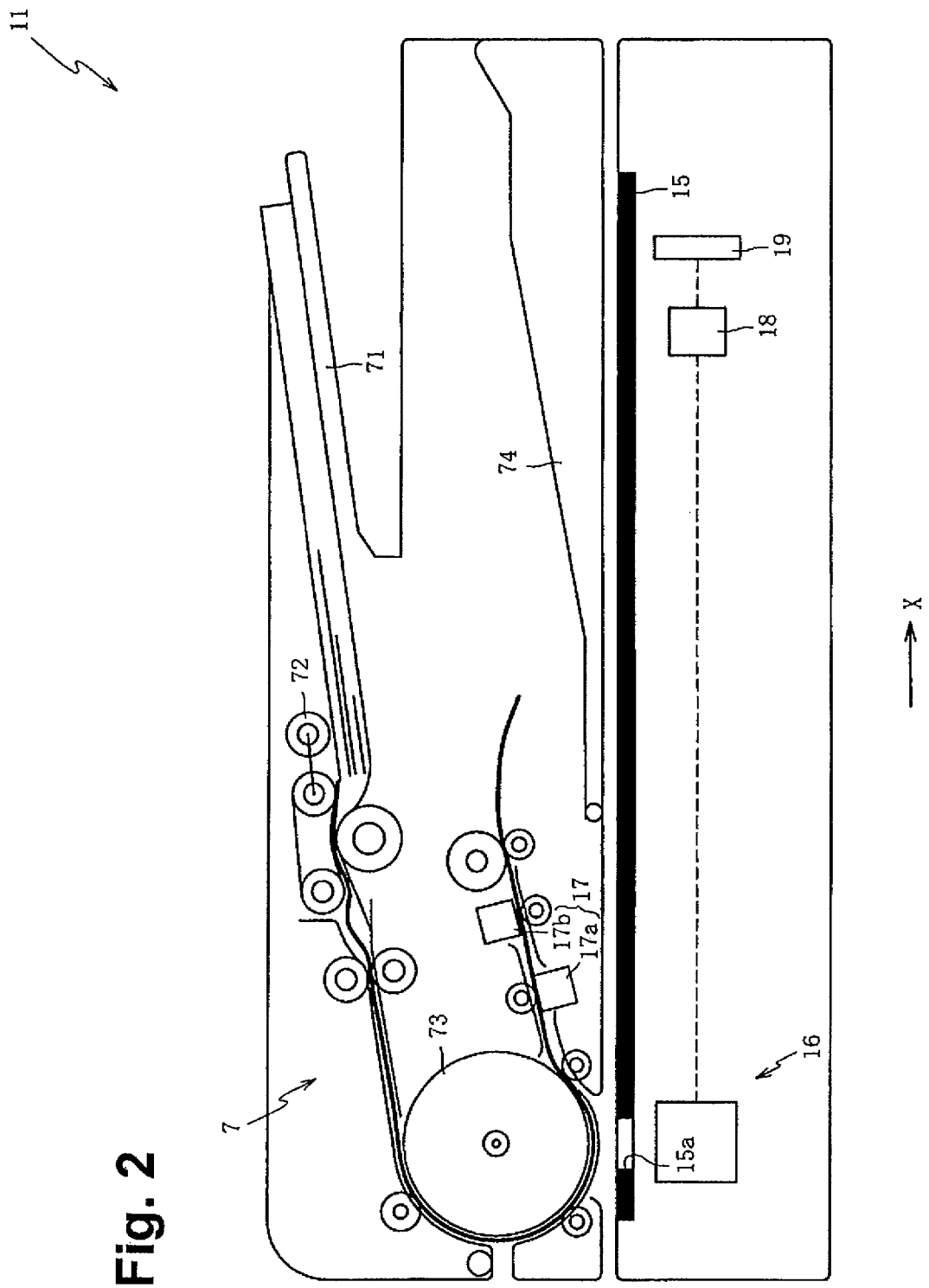
FIG. 2 is a cross sectional view showing the structure of a scanner device.

FIG. 2 is a cross sectional view showing the schematic structure of the scanner device 11. Specifically, FIG. 2 shows the scanner device 11 taken along the direction of an arrow X in FIG. 1 and viewed from the front.

The scanner device 11 is formed mainly of a first read mechanism 16 of a CCD type which reads an original document put on the platen glass 15 while moving in a sub-scanning direction (the direction of the arrow X), and a second read mechanism 17 of a CIS type which is placed within a feed path of the ADF 7 to read both surfaces of an original document fed from the ADF 7.

The first read mechanism 16 is composed of a light source which applies light to the original document, a carriage which is moved in the sub-scanning direction, a group of mirrors, a lens 18, a CCD 19 and the like. The second read mechanism 17 includes a first-surface CIS 17a (an example of a first read device) and a second-surface CIS 17b (an example of a second read device). The first-surface CIS 17a and the second-surface CIS 17b are placed opposite to each other such that the original document fed from the ADF 7 is sandwiched between the CIS 17a and the CIS 17b.

In the flatbed read mode, the carriage (not shown) is moved in the sub-scanning direction along the platen glass 15 to cause the light source to expose the light to the original document while the position of the exposure is changed in the sub-scanning direction. Reflected light from the original document passes through the group of mirrors and the lens 18 and then forms an image on the CCD 19 which in turn performs photoelectric conversion.

In the sheet-through ADF read mode, the original document put on an original-document tray 71 of the ADF 7 is carried onto an ejection tray 74 after the passage through a pickup roller 72 and a carrier drum 73. Photoelectric conversion is performed by a read system shared with the flatbed read through a read window 15a provided in the carrier path.

In the CIS read mode, the original document put in the original-document tray 71 of the ADF 7 is carried onto the ejection tray 74 after the passage through the pickup roller 72 and the carrier drum 73. After the original document passes the read window 15a, photoelectric conversion of both surfaces of the original document is performed by the first-surface CIS 17a and the second-surface CIS 17b located downstream from the window 15a.

Figure 3:
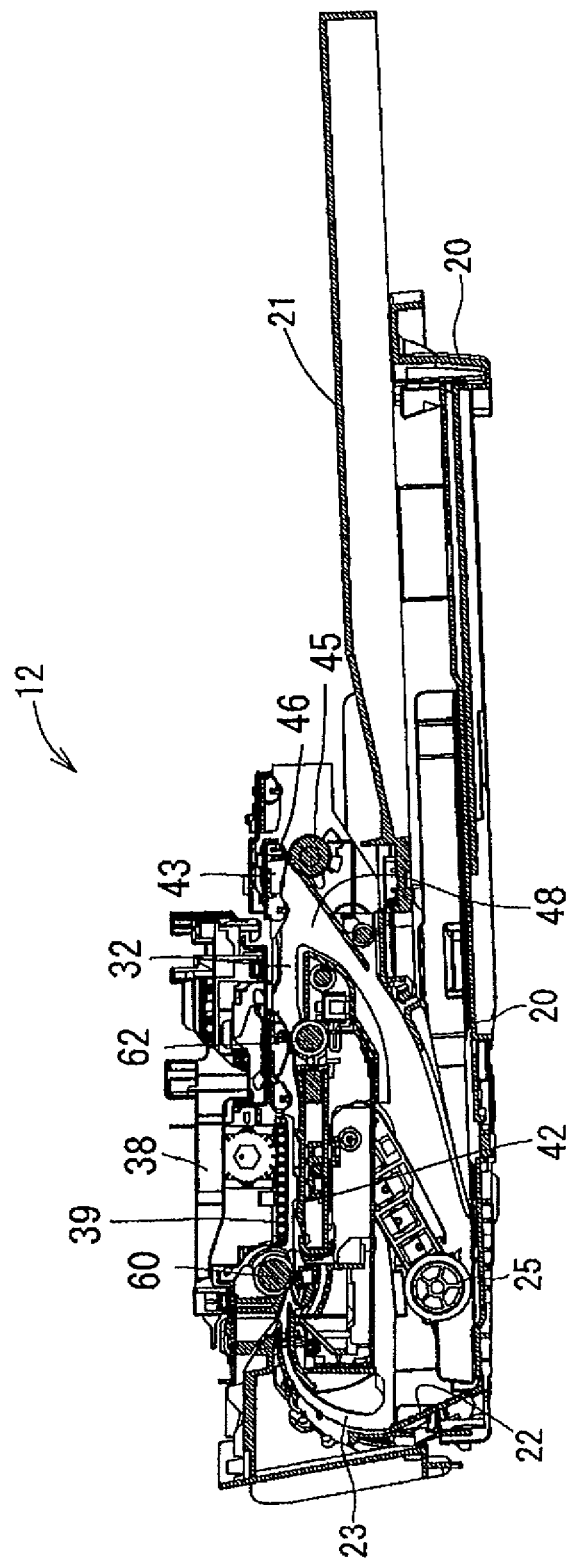
FIG. 3 is a cross sectional view showing the structure of a printer device.

FIG. 3 is a cross sectional view showing the structure of the printing device 12. Specifically, FIG. 3 shows the printing device 12 taken along the direction orthogonal to the direction of the arrow X in FIG. 1 and viewed from the side.

The printing device 12 includes a feed roller 25 which is placed above the feed tray 20, a separate inclined wall 22 which stands from one end portion of the feed tray 20, a feed path 23 which extends continuously from the separate inclined wall 22 to form a U-shaped path, a feed roller 60 which is placed at one end portion of the feed path 23, a platen 42 which supports the printing sheet carried from the feed roller 60, a printhead 39 which is opposing the platen 42 and is mounted on a carriage 38, an ejection roller 62 which is positioned across the printhead 39 from the feed roller 60, a first roller 45 and a second roller 46 which sandwich the printing sheet transported from the ejection roller 62, a feed-path switch arm 43 which pivotally supports the second roller 46 at one end portion, extends upstream, and is rotatable about the rotation center of the first roller 45, and a re-feed path 48 which extends from the other end portion of the feed-path switch arm 43 toward the feed roller 25.

For recording an image on a first surface of the printing sheet in the printing device 12, the printing sheet put in the feed tray 20 is fed toward the separate inclined wall 22 by the feed roller 25, and then transported downstream along the feed path 23. When the printing sheet is transported by the feed roller 60 to a position between the platen 42 and the printhead 39, the printhead 39 moves in a main scanning direction perpendicular to the feed direction of the printing sheet (the sub-scanning direction) and the printhead 39 discharges ink to the first surface of the printing sheet to record the image on the first surface of the printing sheet. The printing sheet, which has the image recorded on its first surface, is transported downstream by the ejection roller 62, the first roller 45 and the second roller 46. Finally, the printing sheet is ejected to the ejection tray 21.

On the other hand, for recording an image on both surfaces of the printing sheet, the image is first formed on the first surface similarly to the abovementioned manner. Then, the printing sheet, which has the image recorded on its first surface, is temporarily stopped while one end portion of the printing sheet is supported on a paper guide surface 32 placed downstream from the ejection roller 62 and the other end portion is sandwiched between the first roller 45 and the second roller 46.

With this state maintained, the feed-path switch arm 43 is rotated counterclockwise about the rotation center of the first roller 45 from the state shown in FIG. 3, so that the feed-path switch arm 43 pushes down the printing sheet. This causes the printing sheet to enter into the re-feed path 48, beginning with the end portion of the sheet supported on the paper guide surface 32. Then, when the first roller 45 and the second roller 46 are driven to reverse, the printing sheet is carried within the re-feed path 48 and the first surface of the sheet comes into contact with the feed roller 25. Thereafter, similarly to the case of the one-surface printing, the sheet is again fed by the feed roller 25, a desired image is recorded on the second surface by the printhead 39, and then the sheet is ejected to the ejection tray 21.

Figure 4:
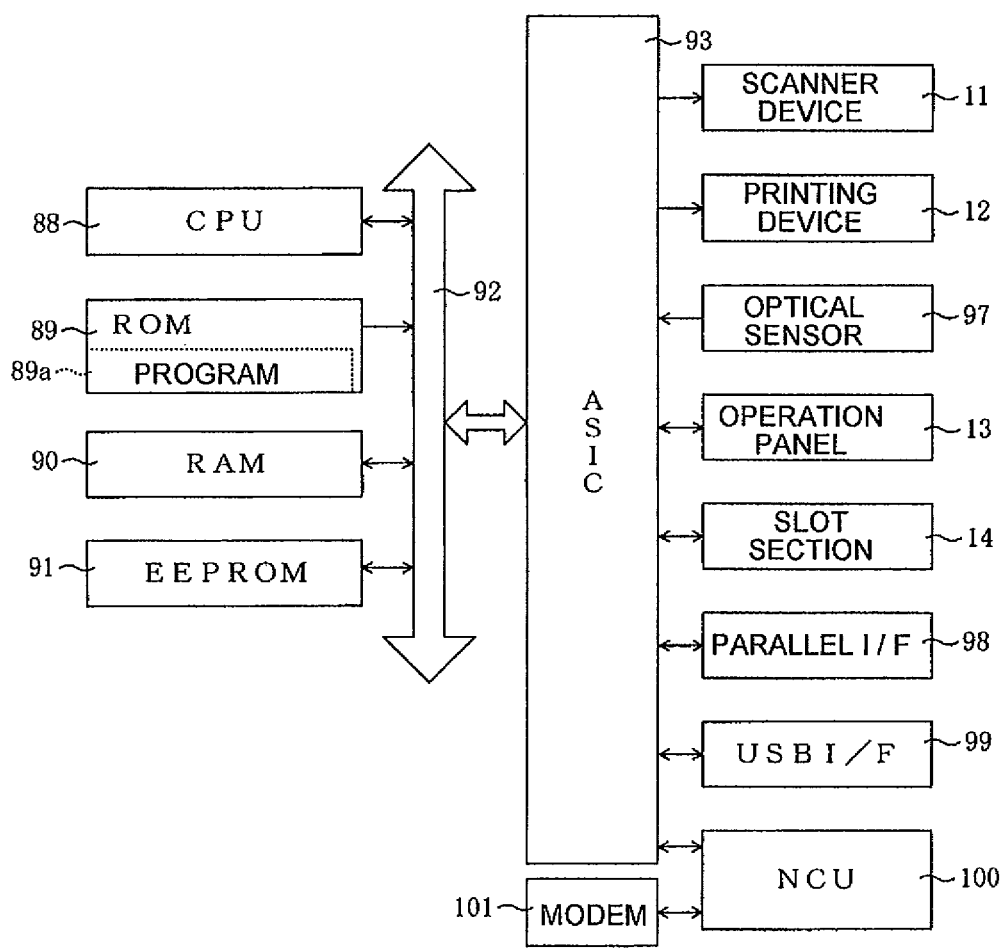
FIG. 4 is a block diagram showing the electrical configuration of the multifunction device.

FIG. 4 is a block diagram showing the electric configuration of the multifunction device 1. The multifunction device 1 includes a CPU 88, a ROM 89, a RAM 90, and an EEPROM 91, all of which are connected to an ASIC 93 through a bus 92.

Figure 6:
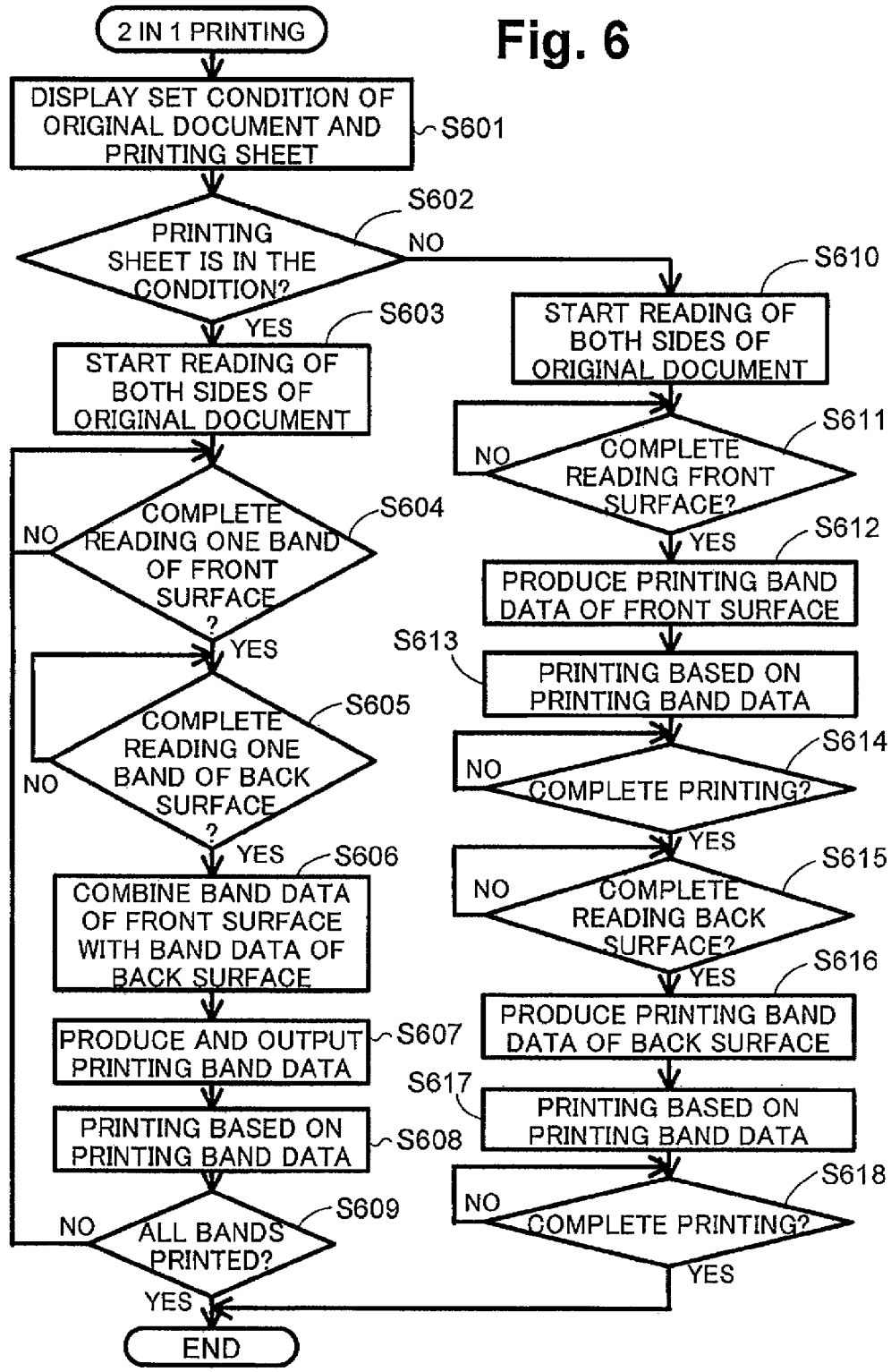
FIG. 6 is a flow chart showing two-in-one printing processing.

The ROM 89 stores programs and the like stored thereon for controlling various types of operations of the multifunction device 1. For example, a printing processing program 89a for performing two-in-one printing processing shown in FIG. 6 is stored on the ROM 89. The RAM 90 is used as a storage area or a work area for temporarily recording various types of data used by the CPU 88 in executing the program. The EEPROM 91 is a rewritable, non-volatile memory.

The scanner device 11, the printing device 12, the optical sensor 97, the operation panel 13, the slot section 14, a parallel interface (I/F) 98, an Universal Serial Bus interface (USB I/F) 99, and a modem 101 and a Network Control Unit (NCU) 100 for realizing the facsimile functions are connected to the ASIC 93, in addition to the bus 92.

Figure 5A:
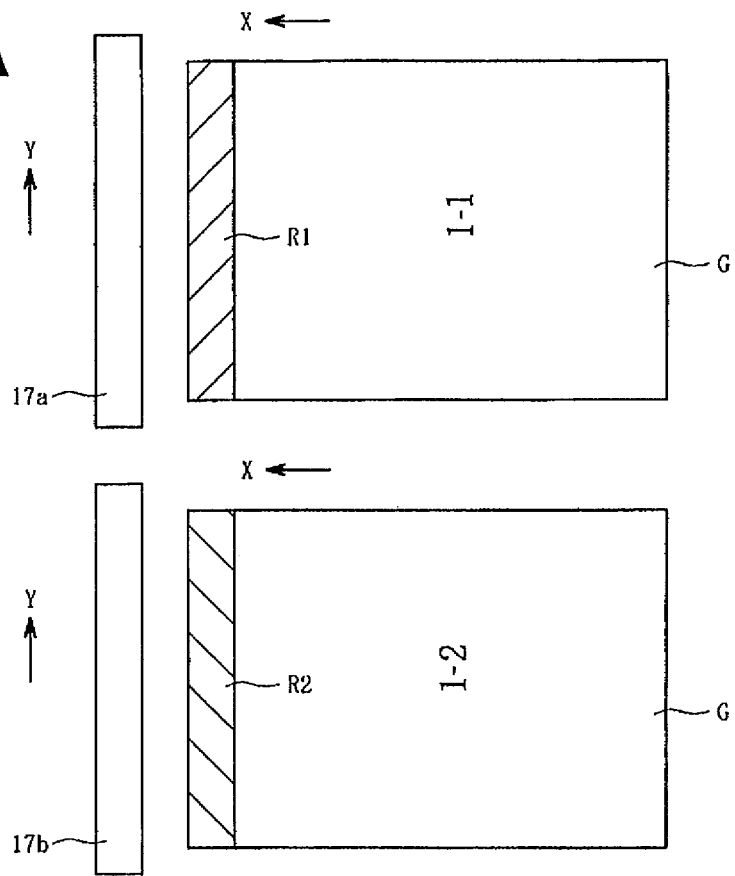
FIG. 5A and FIG. 5B are diagrams for explaining a method of producing printing data in two-in-one printing.
Figure 5B:
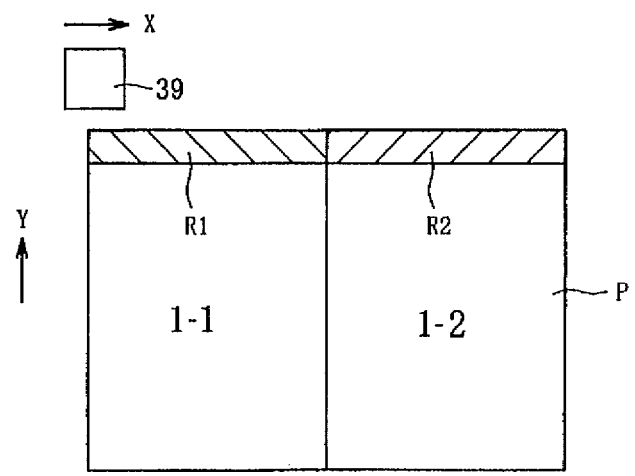

FIGS. 5A and 5B are diagrams for explaining a method of producing printing data when two-in-one printing is performed. FIG. 5A shows read of a first surface of an original document G by the first-surface CIS 17a and read of a second surface of the original document G by the second-surface CIS 17b. FIG. 5B shows printing on a printing sheet P by the printhead 39.

As shown in FIG. 5B, the two-in-one printing in the present embodiment refers to printing of the first surface of the original document G and the second surface of the original document G laid out in parallel in the longitudinal direction of the printing sheet P such that the longitudinal direction of the original document G intersects the longitudinal direction of the printing sheet P. When the printing sheet P has the same size as that of the original document G, a scaled-down image of the document G is printed.

As shown in FIG. 5A, the two-in-one printing is performed on the condition that the original document G is set on the ADF 7 such that the original document G is moved in the sub-scanning direction (the direction of an arrow X in FIG. 5A) so that the longitudinal direction of the original document G intersects the read direction (the direction of an arrow Y in FIG. 5A) of the first-surface SIC 17a.

The two-in-one printing is also performed on the condition that the printing sheet P is set in the feed tray 20 such that the printing sheet P is moved in the sub-scanning direction (the direction of an arrow Y in FIG. 5B) so that the latitudinal direction of the printing sheet P intersects the printing direction (the direction of an arrow X in FIG. 5B) of the printhead 39.

When these conditions are satisfied, the original document G is moved as shown in FIG. 5A in the sub-scanning direction (the direction of the arrow X in FIG. 5A), and the first-surface CIS 17a reads a first band R1 of the first surface, e.g., the front surface of the original document G and the second-surface CIS 17b reads a first band R2 of the second surface, e.g., the back surface of the original document G. After the first band R1 of the first surface and the first band R2 of the second surface are read, the two band data in units of bands are combined linearly to produce printing data in units of bands (an example of printing band data). Each of the first band R1 and the first band R2 includes at least one line corresponding to one line of pixels of corresponding one of CIS 17a and CIS 17b.

According to the produced band data, as shown in FIG. 5B, the printhead 39 performs printing on the printing sheet along its longitudinal direction while the sheet is carried in the sub-scanning direction (the direction of the arrow Y in FIG. 5B). The abovementioned processing is repeated sequentially band by band, each band is read by the first-surface SIC 17a or the second-surface CIS 17b to perform the two-in-one printing on the printing sheet P. If the printhead 39 has the printable width which is equal to or larger than the width of the band, the number of reciprocating motions of the printhead 39 may be reduced to achieve an enhanced printing speed.

FIG. 6 is a flow chart showing the two-in-one printing processing. The processing is performed when the user inputs an instruction for the two-in-one printing through the operation panel 13. The present embodiment will be described in conjunction with the case when the first surface and the second surface of an A4-size original document are scaled down and printed on an A4-size printing sheet on the two-in-one basis.

In the processing, the set conditions of the printing sheet are first displayed on the LCD 41 (S601). For example, the message "Set printing sheet in landscape orientation (such that its longitudinal direction is parallel with the main scanning direction)" is displayed. The display allows the user to recognize the set direction of the printing sheet.

Next, it is determined whether or not the printing sheet is set in accordance with the conditions (S602). Whether or not the printing sheet is set in accordance with the conditions is determined by the optical sensor 97 placed opposite to the feed tray 20.

When it is determined that the printing sheet is set in accordance with the conditions (S602:Yes), the reading of the original document is started (S603). Specifically, the pickup roller 72 of the ADF 7 is driven to start the reading of both surfaces of the original document in the CIS read mode.

It is determined whether or not the reading of one band of the first surface by the first-surface CIS 17a is completed (S604). If it is not completed (S604:No), the processing from S604 is repeated. If it is completed (S604:Yes), then it is determined whether or not the reading of one band of the second surface by the second-surface CIS 17b is completed (S605). If it is not completed (S605:No), the processing from S605 is repeated.

On the other hand, if it is completed (S605:Yes), the band data read band by band at step S604 is combined with the band data read band by band at step S605 (S606). Then, the combined data is subjected to various types of image processing such as binarization to produce printing data band by band (S607). The band data obtained by reading the one band of the first surface by the first-surface CIS 17a is corresponding to the first band data. The band data obtained by reading the one band of the second surface by the second-surface CIS 17a is corresponding to the second band data. The combined data is corresponding to the third band data.

After the printing data of the combined band (an example of printing band data) is produced at S607, the printing for the combined band is sequentially executed in accordance with the produced printing data (S608). It is determined whether or not the printing of all bands is ended (S609). If it is not ended (S609:No), the processing from S604 is repeated. If it is ended (S609:Yes), the printing sheet is ejected and the processing is ended.

On the other hand, if it is determined at the determination step of S602 that the printing sheet is not set in accordance with the conditions (S602:No), that is, when the printing sheet is set in portrait orientation, then the read of the original document is first started similarly to the abovementioned manner (S610).

It is determined whether or not the read of the first surface by the first-surface CIS 17a is completed (S611). If it is not completed (S611:No), the processing from S611 is repeated. On the other hand, if it is completed (S611:Yes), printing data for the first surface is produced, band by band, based on the data read by the first-surface CIS 17*a* (S612), and printing is executed, band by band, in accordance with the produced printing data (S613).

It is determined whether or not the printing for the first surface is completed (S614). If it is not completed (S614:No), the processing at S614 is repeated. If it is completed (S614:Yes), it is determined whether or not the read of the second surface by the second-surface CIS 17*b* is completed (S615). If it is not completed (S615:No), the processing at S615 is repeated.

On the other hand, if it is completed (S615:Yes), printing data for the second surface is produced, band by nand, based on the data read by the second-surface CIS 17*b* (S616), and printing is executed, band by band, in accordance with the produced printing data (S617). It is determined whether or not the printing for the second surface is completed (S618). If it is not completed (S618:No), the processing at S618 is repeated. If it is completed (S618:Yes), the printing sheet is ejected and the processing is ended.

As described above, according to the abovementioned two-in-one printing processing, when the printing sheet is set in accordance with the conditions, the each band data is read by the first-surface CIS 17*a* and the second-surface CIS 17*b* and combined, then the printing data for the combined band is produced and the printing for the combined band can be performed, thereby making it possible to reduce the time period needed before the start of the printing. In addition, since the printing data is produced from the data read band by band and the printing is performed, the capacity of the memory may be reduced.

While the present invention has been described on the basis of the embodiment, the present invention is not limited in any way to the abovementioned embodiment, and it is recognized that various variations and modifications can be made without departing from the scope and spirit of the present invention.

While the abovementioned embodiment has been described in conjunction with the case where the A4-size original document cannot be fed in landscape orientation from the ADF 7, it is possible to configure the ADF 7 such that A4-size and A3-size original documents can be fed in landscape orientation. When such an ADF 7 is mounted, it is determined whether or not the original document is fed in portrait orientation, and then the abovementioned two-in-one printing can be performed on the condition that the original document is fed in portrait orientation and the printing sheet is set in landscape orientation.

Figure 7:
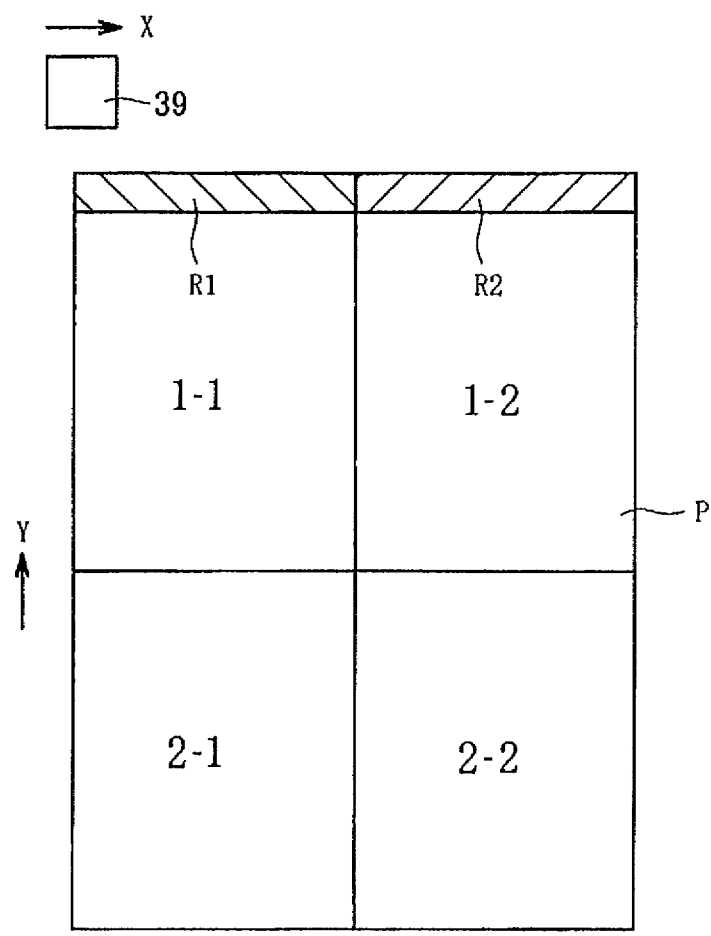
FIG. 7 is a diagram for explaining a method of producing printing data in four-in-one printing.

While the abovementioned embodiment has been described of the two-in-one printing, four-in-one printing may be performed as shown in FIG. 7. For example, a two-in-one image including a first surface and a second surface of a second original document may be placed under a two-in-one image including a first surface and a second surface of a first original document, and the four-in-one printing may be performed. In addition, for example, it is possible to switch between the two-in-one printing and the four-in-one printing depending on the orientation of the printing sheet P in the determination at S602 in FIG. 6.

While the first surface read by the first read device and the second surface read by the second read device are one surface and the other surface of the same original document, respectively, in the abovementioned embodiment, the present invention is not limited thereto. The first read device and the second read device may be configured to read the first surface of a first original document and the second surface of a second original document different from the first original document.

What is claimed is:
1. An image forming apparatus comprising:
   a first read device configured to read an image on a first surface of an original document, line by line, in a main scanning direction, and to produce a first band data formed of at least one line;
   a second read device configured to read another image on a second surface of the original document, line by line, in the main scanning direction and to produce a second band data formed of at least one line during the reading of the first surface by the first read device;
   an image data processor configured to produce printing band data by linearly combining the first band data with the second band data, during the reading of at least one of the first surface and the second surface performed by the first read device and the second read device, respectively; and
   a printing device configured to start printing a combined image of the image on the first surface and the image on the second surface based on the printing band data produced by the image data processor on a printing sheet before the first read device completes reading the image on the first surface of the original document.

2. The image forming apparatus according to claim 1, wherein the first surface and the second surface are one surface and the other surface, which is opposite to the one surface, of the same original document.

3. The image forming apparatus according to claim 1, wherein the printing device includes a printhead configured to move relative to the printing sheet, and
   wherein the printhead has a printable width equal to or larger than a band width associated with the printing band data.

4. The image forming apparatus according to claim 1, wherein the printing device prints a two-in-one printed image on the printing sheet.

5. The image forming apparatus according to claim 4, wherein the printing device includes a determination section configured to determine an orientation of the original document and an orientation of the printing sheet, and
   wherein the printing device prints the two-in-one printed image on the printing sheet when the determination section determines that the orientation of the original document and the orientation of the printing sheet satisfies a predetermined condition, and does not print the two-in-one printed image on the printing sheet when the determination section determines that the orientation of the original document and the orientation of the printing sheet do not satisfy the predetermined condition.

6. The image forming apparatus according to claim 5, wherein the printing device performs printing on both surfaces of the printing sheet when the determination section determines that the orientation of the original document and the orientation of the printing sheet do not satisfy the predetermined condition.

7. The image forming apparatus according to claim 1, wherein the printing device prints a four-in-one printed image on the printing sheet.

8. The image forming apparatus according to claim 1, further comprising an original-document feeder configured to move the original document relative to the first read device and the second read device.

9. An image reading apparatus comprising:
   a first read device configured to read an image on a first surface of an original document, line by line, extending in a main scanning direction and to produce first band data formed of a first plurality of lines;

a second read device configured to read another image on a second surface of the original document, line by line, extending in the main scanning direction and to produce second band data formed of at least a second plurality of lines during the reading of the first surface by the first read device;

an image data processor configured to produce a third band data comprising a third plurality of lines by linearly combining the first band data with the second band data, during the reading of at least one of the first surface and the second surface performed by the first read device and the second read device, respectively; and an output section that outputs the third band data produced by the image data processor before the first read device completes reading the image on the first surface of the original document.

10. The image read apparatus according to claim 9, wherein the first surface and the second surface are one surface and the other surface, which is opposite to the one surface, of the same original document.

11. An image forming apparatus comprising:

a first read device configured to read an image on a first surface of an original document, line by line, in a main scanning direction, and to produce a first band data formed of at least one line;

a second read device configured to read another image on a second surface of the original document, line by line, in the main scanning direction and to produce a second band data formed of at least one line during the reading of the first surface by the first read device;

an image data processor configured to produce printing band data by linearly combining the first band data with the second band data, line by line, during the reading of a subsequent line of at least one of the first surface and the second surface performed by the first read device and the second read device, respectively; and a printing device configured to start printing a combined image of the image on the first surface and the image on the second surface based on the printing band data produced by the image data processor on a printing sheet before the image data processor produces subsequent printing band data for a subsequent line read from the first surface and the second surface of the original document.

* * * * *